United States Patent Office 3,443,261
Patented May 13, 1969

3,443,261
PROSTHETIC STRUCTURES FROM MICRO-
CRYSTALLINE COLLAGEN
Orlando A. Battista, Yardley, Pa., and Mamerto M.
Cruz, Jr., Pennington, and Walter J. Riley, Westfield,
N.J., assignors to FMC Corporation, Philadelphia, Pa.,
a corporation of Delaware
No Drawing. Filed Sept. 1, 1967, Ser. No. 664,955
Int. Cl. A61f 1/00
U.S. Cl. 3—1                                    15 Claims

ABSTRACT OF THE DISCLOSURE

Artificial ivory and bone-like structures formed from a homogeneous mixture of a water-insoluble, microcrystalline ionizable salt of collagen, calcium phosphate and water. Fibers may be included to improve strengths, other ions may be included to increase hardness and collagen cross-linking agents may be included to improve moisture and water-resistance.

This invention relates to a new composition of matter, particularly well suited for prosthetic devices, and to a process for manufacturing the same.

The supporting skeleton of vertebras consists of cartilage and bone. In the embryonic stages, cartilage forms this supporting skeleton and most of the cartilage is replaced in the adult by bone. Cartilage persists in adults at bone joints and in other locations such as the ear, nose, etc. The principal organic constituent of cartilage and bone tissue is collagen and the principal inorganic component in cartilage and bone tissue is calcium phosphate complexes or compounds such as, for example, hydroxyapatite. The chief inorganic constituents are calcium, magnesium, phosphate radicals, carbonate radicals, the fluoride radical and water, the compounds being of varying compositions generally belonging to the apatite group. Other inorganic ions are generally present in trace amounts and other organic matter is also present. The other elements found in minor and trace amounts in bone tissue are aluminum, barium, boron, chlorine, copper, iron, lead, manganese, potassium, sodium, strontium and tin while arsenic, bismuth, lithium, molybdenum, nickel, selenium, silicon, silver and zinc have been detected spectrographically. In general, the differences in hardness and rigidity between cartilage and bone tissue are due to the differences in composition such as differences in the ratios of collagen to the inorganic calcium phosphate compounds and the presence of other radicals as well as the morphological structure.

The bone tissue consists of bundles of collagenous fibers in an amorphous cement material which is probably a protein-polysaccharide complex impregnated with the calcium phosphate complexes or compounds. Sulfur is also included and appears to be present as ester sulfate associated with the polysaccharides. Differences in hardness and other characteristics of the different bone tissues and parts of bone are believed to be due to variations in amounts of calcium carbonate and other constituents such as magnesium, fluorine, carbonate, etc. absorbed on the surface of the hydroxyapatite crystals or the fluoride and carbonate radical may replace the hydroxy radical. Regardless of the precise manner in which these additional substances are associated with the calcium phospahte compounds, these substances appear to alter the crystal lattices of the phosphate compounds. Differences in physical characteristics are also influenced by the morphology of the specific or individual bone tissue. Roughly, the ratio of the collagenous material to the inorganic material in the human bone is slightly less than 1:3, varying from about 1:2.65 to about 1:2.89 in the human femur, based on the weight of dry defatted bone. The foregoing is obviously an oversimplification of the structure and composition of bone tissue which in fact is a most complex structure varying in precise composition with age, individual and species of mammals.

The precise method by which this class of tissue is formed is not known. Physico-chemical theories have been advanced in an attempt to explain the formation of dental calculus and it is possible that bone tissue might be formed in a somewhat similar manner. According to this theory, saliva is considered to be a colloidal solution of proteins which is more or less saturated with calcium and phosphate ions. Surface tension is believed to cause the proteins to concentrate at the surface of the saliva thus reducing the viscosity of the liquid and causing a settling out of inorganic salts which deposit on the teeth surfaces.

Thus far, cartilage and bone tissue has not been formed or duplicated synthetically. In bone surgery, a variety of materials has been used including bone, bone derivatives and synthetic substitutes. Bone from which certain constituents such as minerals, proteins, lipids and water have been removed is generally classed as bone derivative. Synthetic substitutes include metals, certain synthetic polymers, calcium sulfate and hyroxyapatite.

The chemistry of sparingly soluble phosphate salts or specifically the system $Ca-P_2O_5-2H_2O$ and the precise chemistry and structure of the calcium phosphate compounds occurring in natural cartilage and bone tissue are extremely complex. Accordingly, the term "calcium phosphate" is used herein and in the claims to include dicalcium phosphate, tricalcium phosphate, octacalcium phosphate, hydroxyapatite, carbonate-apatite, chlorapatite, fluorapatite and mixtures thereof.

One of the principal purposes of this invention is to provide a new composition of matter which more closely resembles cartilage and bone tissue than the prior synthetic substitutes and to provide a method of forming such composition of matter.

Another purpose of the present invention is to provide prosthetic devices by a synthetic method which more closely resemble cartilage and bone than the synthetic substitutes now available.

The present invention contemplates forming a new composition of matter comprising a water-insoluble microcrystalline partial salt of collagen and calcium phosphate by forming an aqueous colloidal gel or dispersion of the microcrystalline collagen salt and a calcium phosphate in a mesoamorphous state and altering the mesoamorphous structure. Other desired ions and the so-called trace elements and radicals may be included in the dispersion such as, for example, fluorine, carbonate, etc. so as to form fluoroapatite and carbonate-calcium phosphate compounds such as, for example, the hydroxyapatite-carbonate compounds present in some bone tissues. The relative hardness, flexibility, plasticity and rigidity is, in in part, dependent upon the relative proportions of the organic and inorganic constituents and the structural morphology. The ratio of the microcrystalline collagen salt to the calcium phosphate and other inorganic constituents may vary from about 1:20 to about 1:0.01. As is apparent, the higher the inorganic content, the more rigid and dense the product. Hardness and density may also be varied by the alteration of the mesoamorphous state of the calcium phosphate and by the proportion of the carbonate and/or fluoride radicals present.

In the mammals, cartilage and bone must withstand one or more of several forces such as compression, bending, twisting and impact forces. The resistance to some of these forces and certain of the physical strength characteristics of the products of this invention may be altered and improved by incorporating in the aqueous dispersions or gels fibers which function as reinforcing elements.

The fibers may be formed of synthetic polymers such as, for example, polyesters, nylon, polytetrafluoroethylene, polyolefins and polycarbonates, and of natural polymers such as, for example, collagen fibers, amylose fibers, chitin and the like. These fibers may be of any desired size such as conventional textile sizes which vary from about 1 to 10 deniers and vary in length from about ¼ inch to conventional staple lengths of about 1%6 inches. The fibers may be incorporated as individual fibers or in some instances the fibers may be felted or woven or knitted into a desired porous or foraminous fabric in sheet or tubular or other desired configuration which is subsequently impregnated and coated with the microcrystalline collagen-calcium phosphate dispersion. Fibers may constitute from about 1% to 80%, preferably 15%–60%, by weight, of the finished product depending upon the specific application.

The microcrystalline or particulate colloidal form of collagen is prepared in accordance with copending applications of Orlando A. Battista Ser. No. 436,371, now U.S. Patent 3,393,080, filed Mar. 1, 1965, and Ser. No. 586,969, filed Oct. 17, 1966. This new form of collagen is in a physical state intermediate between that of swollen collagen fibrils and tropocollagen units. It is water-insoluble, particulate and colloidal, is substantially free of molecular tropocollagen and water-soluble degradation products. The microcrystals or particles consist of bundles of aggregated tropocollagen units and vary in length from that of an individual tropocollagen unit (about 25 to 50 A.) to under one micron and have diameters from about 25 angstrom units to some hundreds of angstrom units. For the purposes of the present invention, this physical form of collagen should contain at least about 1% by weight of submicron colloidal collagen particles. This form of collagen, which is, in fact, a water-insoluble, ionizable salt of collagen, is unique in its characteristic of forming an aqueous soliquoid or nonelastic type gel in concentrations of 0.5% dispersed salt, the gel exhibiting a pH of about 3.2±0.2 and having a substantially stable viscosity for at least 100 hours at 5° C. when stored in a closed container. This is in sharp contrast to the aqueous elastic or emulsoid type gels formed by tropocollagen and degraded forms of collagen such as gelatin which thicken or exhibit substantial increases in viscosity on standing to produce rubbery masses.

As disclosed in the aforementioned applications, this new physical form of collagen is prepared from undenatured collagen by treatment of undenatured collagen with dilute acid solutions having a pH of from about 1.6 to 2.6. The treated collagen is subsequently mechanically disintegrated in an aqueous liquid until at least about 1%, preferably 25% to 85% or more, has been reduced to a sub-micron, colloidal size. Collagen fibrils exhibit a morphological repetitive band structure which is destroyed in the preparation of this new physical form of collagen and the individual or microcrystalline particles are fragments of the bands, namely, aggregated tropocollagen units.

The action of the acid is three-fold. First, the acid serves to cause a limited swelling of the fibers. Second, there is a limited hydrolysis of selective peptide linkages within the noncrystalline or amorphous regions of the collagen fibrils so that subsequent mechanical disintegration permits a ready fragmentation of the weakened morphology into microcrystalline particles having dimensions intermediate between those of tropocollagen and collagen fibrils. Third, a portion of the acid reacts with free primary amino groups of the collagen to form what may be termed a collagen salt which becomes ionized in the presence of water.

Acids which are satisfactory include both inorganic and ionizable organic acids such as, for example, hydrochloric acid, sulfuric acid, hydrobromic acid, phosphoric acid, cyanoacetic acid, acetic acid and citric acid. Phosphoric acid, acetic acid and citric acid are preferred. Citric acid and hydrochloric acid are substantially equivalents and permit ready flexibility and ease of control in the treatment of the collagen. "Ease of control" has reference to the ability to arrest the swelling and hydrolysis of the collagen fibers at that point whereby the insoluble colloidal material is formed and is retained while preventing the rapid degradation of the collagen to a soluble degradation product. In lieu of the acids, acid salts may be used satisfactorily. Thus, for example, dihydrogen sodium or ammonium phosphates may be substituted for phosphoric acid, or ammonium or sodium hydrogen sulfates may be substituted for sulfuric acid.

One of the preferred sources of collagen is purified bovine hide and for the purposes of the present invention the hide may be in a ground fibrous form and is subjected to extraction with organic liquids such as acetone to reduce the fatty material content.

In forming the synthetic cartilage-like and bone-like structures of the present invention, mesoamorphous calcium phosphate is mixed with an aqueous gel of the water-insoluble ionizable microcrystalline collagen salt. Since bone tissues contain some citric acid and phosphate salts, the microcrystalline collagen is prefreably prepared by treatment of the collagen source material with citric acid or phosphoric acid or an acid phosphate salt so as to avoid the presence of what may be termed foreign ions in the product. The calcium phosphate may be formed by mixing solutions of a soluble phosphate, such as, for example, sodium phosphate and a soluble calcium salt, such as, for example, calcium acetate so as to provide a desired molar ratio of calcium to phosphate, preferably to provide a ratio of about 1.6:1.

In the biological formation of bone tissue and particularly the hard tissue of teeth, an apatite-carbonate compound is produced which apparently accounts for the extreme hardness of such tissue. In the production of the structures according to this invention, desired amounts of the various anions may be incorporated in the gel mixtures, preferably in the preparation of the calcium phosphate, to provide relative ratios approximating those of natural bone tissue. In the addition of, for example, the carbonate anion and the fluoride anion, about 1 to 10 molar percent, preferably 2 to 5%, of the phosphate anion may be replaced by the carbonate anion and about 0.05 to 2 molar percent, preferably 0.1 to 0.6%, of the phosphate ion may be replaced by the fluoride anion. Where it is desired to incorporate other ions such as the carbonate and fluoride anions, solutions of salts such as sodium carbonate and sodium fluoride are preferably added during the preparation of the calcium phosphate. Preferably, these solutions are added to the soluble phosphate solution so that upon mixing with the solution of the calcium salt, the salts containing the other ions will co-precipitate with the calcium phosphate.

The solutions of the soluble salts are preferably mixed under vigorous agitation. The resulting slurry of the insoluble salts will generally have an alkaline pH of from 10.5 to about 12. The mesoamorphous calcium phosphate is separated by filtration and washed thoroughly with water so as to remove soluble salts. The recovered wet salt is slurried in water and just prior to the addition of the slurry to an aqueous gel of the microcrystalline collagen salt, the pH of the slurry is preferably adjusted to a pH of between about 3 to 5 by the addition of acetic acid.

Where the ratio of the calcium phosphate to collagen is within the upper portion of the range, the mixture after drying forms a white bone-like structure. Where the ratio of the calcium phosphate to collagen is in the lower portion of the range, the mixture after standing overnight at a temperature of about 5° C. separates with a non-gelatinous mass at the top which, when recovered from the lower water layer and allowed to dry, forms an amber colored cartilage-like structure.

In bone tissue, the composition of different bones and different parts of bones may be substantially the same but the physical structure may vary from a hard, dense compact mass (cortical bone) to a very porous mass (cancellous bone). In many surgical procedures, a cancellous type structure is desired rather than a hard compact cortical-like mass so as to permit a ready absorption of blood and an increased rate of absorption by the body and a corresponding replacement with new natural bone tissue. In forming the products of the present invention, the compactness and porosity of the products may be varied by varying the composition and the processing conditions including the drying procedure.

Assuming a fixed composition of the collagen gel-calcium phosphate mixture, for example, equal parts by weight of micro-crystalline collagen and calcium phosphate, the porosity of the dried product formed therefrom may be varied by varying the amount of dispersed air or gas in the gel mixture. A gel mixture containing substantially no dispersed gas when oven-dried produces a very hard, dense product resembling cortical bone. An aerated gel mixture containing 40% dispersed air or gas, by volume, when oven-dried forms a product having a very porous interior structure but the surface portions are of an appreciable lower porosity and are hard and somewhat horn-like. On the other hand, the same gel mixture containing 40% dispersed air or gas when freeze dried forms a product of substantially uniform porosity and the surface portions are of approximately the same structure as the interior and the product resembles cancellous bone. Porosity may also be controlled by the concentration of solids in the gel mixture. In general, the higher the microcrystalline collagen content of the gel mixture, the greater the compactness of the product. Gel mixtures containing 20% or more microcrystalline collagen form hard, compact products whereas those containing a maximum of 5% microcrystalline collagen form very porous structures. Structures formed by freeze-drying exhibit the greatest porosity; those formed by air drying, a lower porosity; and, those formed by oven-drying, the lowest porosity.

From the preceding discussion, it is apparent that the products of this invention may vary from a rather soft, tough, pliable structure to a firm, rigid cancellous type structure to a hard, compact, dense cortical type structure depending upon the composition and concentration of the gel mixture and upon the precise drying method. In addition to the controls available based upon these conditions, hardness of the products may also be varied by incorporating other ions as by the addition of such substances as sodium fluoride and sodium carbonate to the sodium phosphate solution in the preparation of the calcium phosphate.

The solids content of the microcrystalline collagen salt dispersion or soliquoid type gel may be varied depending upon the nature of the desired product. Stable non-elastic type gels may be formed with as low as one-half percent by weight of the microcrystalline collagen salt. For the cartilage and bone type products, the gels may contain up to about 30% or more microcrystalline collagen salt.

Aqueous gels prepared from the water-insoluble ionizable microcrystalline collagen salts exhibit a pH of from about 2.6 to about 3.8, the gels exhibiting optimum properties having a pH between about 3.0 and 3.4. Fortuitously, mesoamorphous calcium phosphate is transformed to the mesocrystalline state at room temperature at pH's of between about 3.5 and 5.5. Accordingly, in the mixtures of the microcrystalline collagen salt dispersion and the calcium phosphate slurry, the pH may be such that about optimum gel conditions may be maintained for the alteration of the crystal structure of the calcium phosphate. Due to the complexity of the nucleation process which is common in the case of sparingly soluble salts, the calcium ions and the phosphate ions interact with the colloidal collagen particles. This interaction involves a solution transport mechanism of the ions to the nucleation sites furnished by the surfaces of the colloidal collagen particles.

In order to form the water-insoluble and structurally stable products, it appears that the microcrystalline colloidal collagen must be in a form such as will allow an interaction with the calcium phosphate inorganic constituents. The colloidal microcrystalline collagen dispersion or gel must contain the calcium and phosphate ions in such state that they can interact to alter the crystalline structure of the inorganic constituents. From the foregoing discussion, it is apparent that the product will have a very intimate and uniform distribution of the various constituents.

The size and shape of the calcium phosphate crystals may be modified by the proportion of carbonate anions present. In general, hydroxyapatite crystallizes in needle form and the presence of small proportions of carbonate ions, such as up to about 25% carbonate anions, based on the weight of the hydroxyapatite, tends to reduce the length of the crystals. As noted above, the gels of the collagen salt have a pH of 3.0 to 3.4 and the pH of the gel may be adjusted, that is, raised to at least 3.5 to provide conditions favorable for the alteration of the structure of calcium phosphate.

The mixtures are dried to a moisture or water content of from about 5% to about 25%. Where porous structures are desired, drying is preferably effected by a freeze drying process. After the moisture content has been reduced to a value within this range, the structures are preferably heated, as in an oven in an inert atmosphere, to a temperature between about 100° C. and about 150° C. for from 2 to 10 hours. This heating step increases substantially the stability of the structural characteristics of the products in the presence of aqueous liquids.

In forming bone-like structures, the microcrystalline gel with the added calcium phosphate compounds may be extruded through orifices and the resulting individual filaments brought together without a complete coalescence of the filaments. The concentration of the extruded mass may be sufficiently high to allow the filaments to be brought together a short distance from the point of extrusion or the filaments may be partially dried before they are brought together. The assembled filaments are then dried either in an oven or by a freeze drying process. By this method, the product will possess open longitudinal passages and particularly where the products are freeze dried the individual filament portions may have a fine porous interior structure. Alternatively, the extruded filaments may be collected on a moving or reciprocating collecting box and the group of filaments moved transversely with respect to the movement of the collecting box to build up any desired structural configuration of the filaments as shown in United States Patent No. 3,082,481.

The following examples illustrate the range of products which may be formed in accordance with the present invention.

EXAMPLE I

A calcium phosphate slurry was formed by first dissolving 4.78 parts of trisodium phosphate in 100 parts of deionized water. The trisodium phosphate solution was then mixed with a solution containing 17.6 parts of calcium acetate in 100 parts of deionized water with agitation. The resulting slurry had a pH of 11.3. The salt was recovered, washed to remove soluble salts, slurried in deionized water and the pH was subsequently reduced to about pH 3.2 by the addition of acetic acid. The microcrystalline collagen was prepared by treating one part by weight of ground, vacuum freeze dried bovine collagen with 100 parts of an aqueous solution of hydrochloric acid having a pH of about 2.4. The treated bovine collagen was transferred to a Waring Blendor where it was attrited for about 25 minutes at a temperature which was maintained below 25° C. The resulting gel had a pH of about 3.6.

Two hundred fifty parts of the calcium phosphate slurry was then mixed with 250 parts of the microcrystalline collagen gel with agitation. The resulting mixture was placed in a refrigerator, cooled to about 5° C. and maintained in the refrigerator overnight. A semi-solid gel-like material collected at the surface of the liquid which was separated from the liquid and dried in an oven. The resulting product was an amber colored product and has the appearance and feel of cartilage.

Another sample was prepared in the same manner but the semi-solid gel-like material which was recovered was freeze dried for 12 hours to a water content of about 10% (−40° to −50° C., vacuum five microns, heating cycle not exceeding 30° C. with condensaiton of sublimed water at 60°C.). The resulting product was a porous structure. After the freeze dried product was obtained, it was placed in an oven and heated to a temperature of about 103° C. for 3 hours.

Both products retained their structure upon continued immersion in water, the initial cartilage-like product became rather soft and very pliable while the heat-treated product remained firm but pliable. By analysis, the products contained 2.54% calcium, 1.38% phosphorus and 12.96% nitrogen.

EXAMPLE II

Calcium phosphate was formed by mixing trisodium phosphate and calcium acetate solutions as described in Example I. After thoroughly washing the precipitated salt, it was slurried in deionized water to form a slurry containing approximately 25% by weight calcium phosphate.

Microsystalline collagen salt of citric acid was formed by slurrying a ground, vacuum freeze-dried bovine collagen in water and the slurry was then centrifuged to provide a slurry containing approximately 31% of the dispersed ground collagen. A mixture of equal parts of isopropanol and water was then added to reduce the solids content of the slurry to approximately 10%. Two thousand three hundred ninety grams of this slurry was then mixed with 814 grams of isopropanol and 800 cc. of a 1 N solution of citric acid in isopropanol was then added to the slurry during continuous agitation. The pH of the liquid was approximately 2.9. The slurry was then centrifuged to reduce the solids content to about 31%. Additional amounts of isopropanol was then added and the slurry was then subjected to centrifuging to remove as much liquid as possible. The residue was air dried.

The air dried product was mixed with deionized water and subjected to attrition in a blender type mixer at a temperature below 25° C. to form a suspensoid containing 6% of the disintegrated microcrystalline collagen salt.

The pH of the slurry of calcium phosphate was adjusted to a pH of 3 by the addition of acetic acid. To 300 parts of the suspensoid, there was added sufficient of the calcium phosphate slurry to provide 18 parts of calcium phosphate. The mixture was subjected to vigorous agitation, then deaerated and poured into a pan to a depth of about ¾ inch and allowed to dry in the air for about one week. The suspensoid formed had an intense white appearance and when dried exhibited an appreciable shrinkage but the product was stiff and hard. When cut and the cut surface examined under the microscope, it exhibited a fine, porous sponge-like structure. By analysis, the product contained 21.46% calcium, 9.73% phosphorus and 7.88 nitrogen.

A portion of the product was heated in an oven to a temperature of about 103° C. for 2 hours. Samples of the original product and the heat treated product retained their structure on continued immersion in water. The original product became soft and very pliable, but the heat treated product remained firm.

EXAMPLE III

A microcrystalline collagen salt of citric acid as prepared in accordance with Example II was dispersed in deionized water to form a 2% gel. Tribasic calcium phosphate of a reagent grade was dispersed in deionized water to form a 25% dispersion. To 500 parts of the microcrystalline collagen salt dispersion there was added sufficient of the tricalcium phosphate dispersion to provide 10 parts of the calcium phosphate. The pH of the resulting mixture was then adjusted to a pH of 3.2 by the addition of a 1 N solution of citric acid in deionized water. Initially, the mixture was a uniform viscous white liquid mass and after adjusting the pH and allowing the mass to stand, it separated into a white semi-solid, gel-like mass at the surface of a relatively clear liquid.

The semi-solid, gel-like mass was separated from the liquid and after drying was a hard, white, bone-like structure which could be cut and machined. When placed in water, the product absorbed about 40% water but did not disintegrate.

EXAMPLE IV

A microcrystalline collagen salt of citric acid as described in Example II was dispersed in deionized water to form a 6% gel. To 200 parts of the gel, a sufficient amount of a 25% slurry of reagent grade tribasic calcium phosphate in deionized water was added so as to provide 15 grams of the phosphate. The resulting mixture had a pH of 4.2 and was transferred to a large glass tube (about 1¼ inch internal diameter) and allowed to partially dry in the tube. After it had dried sufficiently to shrink from the walls of the tube, it was removed and air dried. The dried product was white and when cut exhibited a porous interior with the surface portions of substantially lower porosity and having a hornified appearance.

In a like manner, a mixture of the dispersed collagen salt and tribasic calcium phosphate was prepared and poured into the annular space between the walls of a glass tube (1¼ inch internal diameter) and a rubber tube having a ¾ inch external diameter positioned in the glass tube. The mixture was frozen, then removed from the glass tube by heating the glass tube sufficiently to melt the surface portion of the mixture in contact with the glass tube and pulling out the rubber tube with the attached frozen mass. The rubber tube with the frozen mass was placed in a commercial freeze drier and the frozen mass dried at the schedule set forth above (Example I) to a moisture content of about 10%. The resulting tubular product was removed by stretching the rubber tube and sliding off the white porous structure. When cut, the product appeared to have a substantially uniform porosity throughout its cross-section.

Portions of the rod-like and tubular products were heated in a oven to a temperature of about 105° C. for 3 hours. Samples of the unheated products and the heat treated products were placed in water. All samples absorbed water without losing their shape. The unheated samples became softened and somewhat pliable while the heat treated samples remain firm.

EXAMPLE V

A mixture of the mircocrystalline collagen dispersion and tribasic calcium phosphate was prepared as described in Example IV. To this mixture, there was added three parts of 1½ denier nylon 66 staple fibers ½ inch in length. The mass was thoroughly mixed, partially deaerated to reduce the volume about 50% and then was poured into a tray to a depth of about ½ inch and freeze dried overnight (−40° to −50° C., vacuum five microns, heating cycle not exceeding 30° C. with condensation of sublimed water at 60° C.). The product was a porous, white, mat-like structure with good flexibility. A portion of the product was heated in an oven at 105° C. for 3 hours. Both products when placed in water absorbed water but retained their structure. The unheated product became soft and plastic whereas the heat treated product remained firm but was somewhat more flexible than the original dry product.

In a like manner, a product was prepared wherein the nylon staple fibers were replaced by Urschel milled fibrous collagen fibers having diameters of 30 to 35 microns and lengths of about ¼ inch. The properties of the dried product and the heat treated product were similar to those described above.

EXAMPLE VI

A slurry of calcium phosphate was forme by mixing a solution of 44 parts of calcium acetate in 100 parts of water with a solution containing 38 parts of sodium phosphate in 100 parts of water. After thorough mixing, the precipitated salt was recovered and washed to remove soluble salts. The resulting precipitate was slurried in 162 parts of water. The slurry was then mixed with 200 parts of a 12% dispersion of microcrystalline collagen salt of citric acid (Example II). The resulting mixture was attrited in a Hobart mixer for about 15 minutes at a temperature of 55° C. and the pH was adjusted to about 4.5 by the addition of a 1 N solution of citric acid in water. The resulting mass was poured into a tray to a depth of about ¼ inch and allowed to air dry for two days. The resulting product which contained about 70% water was then leached in water for four days. During this period, no breakdown of the structure was evident and the structure exhibited only a very slight swelling.

The leached product was freeze dried overnight under the conditions as set forth in Example I. The resulting product was a hard, porous, white structure. The product was heated in an oven at 103° C. for about 4 hours. The heat treated product when placed in water absorbed about 700% water based on the weight of the dry product without swelling and remained firm.

EXAMPLE VII

To 100 parts of a 12% dispersion of the microcrystalline collagen salt of citric acid as described in Example II there was added 3.3 parts of calcium acetate dissolved in 21 parts of deionized water. To this mixture, there was added a sufficient volume of an 18° sodium phosphate solution to provide 3.24 parts of sodium phosphate. The mixture was attrited in a Hobart mixer at about 55° C. until a smooth mass was formed. A 1 N solution of citric acid was then added to adjust the pH to 3.5. As the pH was reduced, the mixture had a lumpy texture and additional water was added until a smooth gel-like mixture was formed. To this gel mixture, there was then added 8.5 parts of a conventional polyester staple fiber (poly[ethylene glycol terephthalate]) of a 1 denier size and a ¾ inch length. After thorough mixing, the mass was then poured into a tray to a depth of about ½ inch and freeze dried as described in Example V.

In a like maner, another mixture as described was formed and poured into a tubular mold and freeze dried as described in Example IV.

Both cast products were subsequently leached in water for 4 days to remove soluble salts. When placed in water, the products absorbed water without swelling. After leaching, the products were oven dried and heated to 105° C. for 3 hours. The products were white, hard and porous and, when reimmersed in water, absorbed water without swelling and remained firm.

EXAMPLE VIII

A calcium phosphate-fluoride slurry was formed by slowly adding a solution containing 16 parts of calcium acetate in 100 parts of deionized water to a solution of about 14 parts of sodium phosphate and 0.2 part of sodium fluoride in 100 parts of deionized water. The precipitate which was formed was recovered and after washing with deionized water, 10 parts of the recovered salt were slurried in 90 parts of deionized water. The slurry was added to 90 parts of a dispersion of a microcrystalline salt of citric acid as described in Example II, the dispersion containing 20% of the collagen salt. The mass was partially deaerated to reduce the volume about 50% and was then transferred to a tray to a depth of about ¼ inch and freeze dried overnight. The product was then heated to about 103° C. for 2½ hours. The product was a dense, hard mass exhibiting a uniform fine porous structure. When placed in water, it absorbed some water without swelling and remained firm.

EXAMPLE IX

A calcium phosphate-carbonate slurry was formed by slowly adding a solution containing 16 parts of calcium acetate in 100 parts of deionized water to a solution of about 14 parts of sodium phosphate and 1 part of sodium carbonate in 100 parts of deionized water. The precipitate which formed was recovered and after washing with deionized water, 10 parts of the recovered salt were slurried in 90 parts of deionized water. The slurry was added to 90 parts of a dispersion of a microcrystalline salt of citric acid as described in Example II, the dispersion containing 20% of the collagen salt. The mass was partially deaerated to reduce the volume about 50% and was then transferred to a tray to a depth of about ¼ inch and freeze dried overnight. The product was then heated to about 103° C. for 2½ hours. The product was similar to that of Example VIII and was a dense, hard mass exhibiting a uniform fine porous structure. When placed in water, it absorbed some water without swelling and remained firm.

EXAMPLE X

A calcium phosphate-carbonate-fluoride slurry was formed by slowly adding a solution containing 16 parts of calcium acetate per 100 parts of deionized water to a solution of about 14 parts of sodium phosphate, 1 part of sodium carbonate and 0.2 part of sodium fluoride per 100 parts of deionized water. The precipitate which was formed was recovered and after washing with deionized water, 90 parts of the recovered salt were slurried in 100 parts of deionized water. The slurry was added to 100 parts of a dispersion of a microcrystalline salt of citric acid as described in Example II, the dispersion containing 5% of the collagen salt. The mass was partially deaerated to reduce the volume about 70% and was then transferred to a tray to a depth of about ¼ inch and dried in an oven at about 80° C. The product was then heated to about 105° C. for 2 hours. The product was a dense, and very hard structure. When placed in water, it absorbed a small amount of water, exhibited no swelling and remained hard.

In most of the foregoing examples, reference has been made to the citric acid salt of collagen, this being based merely upon convenience. Other ionizable acids, both inorganic and organic, may be used in place of citric acid in forming the collagen salt and, when corresponding salts of collagen are substituted for the citric acid salt, the products have like properties.

The compositions as disclosed herein and particularly those having the higher ratios of calcium phosphate compounds to collagen are satisfactory for the production of three-dimensional, self-supporting, impact-resistant structures. The three-dimensional structures are readily machined, sawed, drilled and worked and may be given a fairly high polish. The hard, dense, compact structures when machined and polished, for example, have much the same appearance and feel as ivory. Accordingly, the structural material may be used to replace ivory in musical instruments such as piano keys. Billiard balls, costume jewelry and blocks may also be used for sculpturing. Because of the collagen content, a variety of dyes may be used to provide any desired color.

For many purposes, resistance to moisture and water may be substantially improved by incorporating in the gels and mixtures prior to drying cross-linking agents for collagen. Preferably, these agents are incorporated in the mixtures during the attrition and mixing period to provide a homogeneous distribution of the agent throughout the mass. Typical cross-linking agents which are satisfactory include the various formaldehyde-base cross-linking agents such as, for example, urea-formaldehyde precondensate and melamine-formaldehyde precondensate, formaldehyde, glyoxal, acetaldehyde, glutaraldehyde, potassium alum, chrome alum, iron alum, basic aluminum acetate, cadmium acetate, copper nitrate, barium hydroxide, water-soluble diisocyanates, etc. The specific cross-linking agent which is utilized will be dependent upon the end use of the products.

In the foregoing discussion and examples, reference has been made in some instances to "bovine hide." By this term, it is to be understood that the portion of the bovine hide or other hide utilized in preparing the microcrystalline colloidal collagen is that portion of the hide which is essentially collagen and from which the hair and flesh have been removed. Essentially, the material is the corium portion of the hide. As pointed out hereinabove, in the treatment of the collagen source material with an acid, a certain portion of the acid becomes chemically bound to the collagen. When the amino acid residues of bovine corium collagen, for example, are considered, 1 gram of collagen contains approximately 0.78 millimole of primary amino groups available to react with an added acid. Actual analyses of products derived from microcrystalline collodial collagen gels prepared with various acids showed a bound acid content varying from about 0.4 to about 0.7 millimole of acid (calculated as HCl) per gram of collagen with an average bound acid content of about 0.58 millimole of acid per gram of collagen.

As indicated hereinabove, the principal inorganic constituent of the compositions, that is, the calcium phosphate compounds may vary in the ratio of calcium to the phospate ion from about 1:1 to about 1.6:1 and it is probable that in some instances there occurs in the mass a mixture of specific calcium phosphate compounds. In the production of articles such as, for example, combs, spatulas, etc., a high solids content aqueous mixture of the dispersed collagen salt and calcium phosphate may be utilized with added fibers to increase flexural strength and a cross-linking agent to improve moisture and water resistance. The mixture may be shaped by the use of press molds of the desired configuration.

In preparing the compositions for use in bone surgery where the structure will be inserted in a mammal such as a dog or cat, bactericides, fungicides and antibiotics may be incorporated in the products either during their preparation or, since many of the products are porous, these susbtances may be introduced by impregnation procedures. Hemostats may be included for a specific purpose where either a coagulant or anti-coagulant is desired in a specific site. Alternatively, a high solids content aqueous mixture of the dispersed collagen salt and calcium phosphate or a wet mass of a ground-up dried product may be used in the treatment of bone damage in the manner in which ground up, moist bone is now used. In this instance, the bactericide, fungicide, antibiotic, hemostat or other desired additive is incorporated in the moist mass. Examples of agents which may be included are well known to those skilled in the art and include such substances as chlorotetracycline, erythromycin, bacitracin and heparin sodium, etc.

We claim:

1. The method of preparing a three-dimensional, water-insoluble structure comprising preparing an intimate and homogenous mixture in an aqueous medium of a colloidally dispersed, water-insoluble, ionizable salt of collagen, the amount of collagen salt being at least 0.5% by weight, at least 1% by weight of the dispersed collagen salt consisting of bundles of aggregated tropocollagen units, each of the bundles having a particle size not exceeding 1 micron, and dispersed calcium phosphate, the ratio of the amount of collagen salt to calcium phosphate being from about 1:20 to about 1:0.1, shaping the mixture and drying the shaped mixture.

2. The method as defined in claim 1 wherein the ionizable salt of collagen contains from about 0.4 to about 0.7 millimole of bound acid (calculated as HCl) per gram of collagen.

3. The method as defined in claim 1 wherein the ionizable salt of collagen is a citric acid salt of collagen.

4. The method as defined in claim 1 wherein the ionizable salt of collagen is a hydrogen chloride salt of collagen.

5. The method as defined in claim 1 wherein the mixture includes from 1% to 10% of the carbonate anion based upon the phosphate anion.

6. The method as defined in claim 1 wherein the mixture includes from 0.05% to 2% of the fluoride anion based upon the phosphate anion.

7. The method as defined in claim 1 wherein the mixture includes fibers.

8. The method as defined in claim 1 wherein the shaped mixture is freeze dried.

9. The method as defined in claim 1 wherein the shaped mixture is dried to a moisture content of between about 5% and 25% and is then heated in an inert atmosphere to a temperature of between about 100° and 150° C. for from 2 hours to 10 hours.

10. A unitary three-dimensional structure comprising an intimate and homogeneous mixture of a water-insoluble microcrystalline, ionizable salt of collagen and calcium phosphate, the ionizable salt of collagen being characterized in that when dispersed in water at least 1% by weight of the collagen salt having a particle size not exceeding 1 micron and consisting of bundles of aggregated tropocollagen units forms a 0.5% aqueous soliquoid having a pH of about $3.2 \pm 0.2$ and having a stable viscosity for at least 100 hours at 5° C. when stored in a closed container.

11. A structure as defined in claim 10 wherein the ratio of the amount of the collagen salt to calcium phosphate is from about 1:20 to about 1:0.01.

12. A structure as defined in claim 10 wherein the ionizable salt of collagen contains from about 0.4 to about 0.7 millimole of bound acid (calculated as HCl) per gram of collagen.

13. A structure as defined in claim 10 wherein the ionizable salt of collagen is a citric acid salt of collagen.

14. A structure as defined in claim 10 wherein the ionizable salt of collagen is a hydrogen chloride salt of collagen.

15. A structure as defined in claim 10 which is a prosthetic device.

References Cited

UNITED STATES PATENTS

| | | | |
|---|---|---|---|
| 3,374,103 | 3/1968 | Barkin | 264—202 X |
| 3,276,448 | 10/1966 | Kronenthal | 128—334 |
| 2,838,363 | 6/1958 | Veis et al. | 264—202 |
| 2,610,625 | 9/1952 | Sifferd | 128—156 |

JULIUS FROME, *Primary Examiner.*

T. MORRIS, *Assistant Examiner.*

U.S. Cl. X.R.

264—202; 128—1; 106—161, 155

UNITED STATES PATENT OFFICE
CERTIFICATE OF CORRECTION

Patent No. 3,443,261                                                               May 13, 1969

Orlando A. Battista et al.

It is certified that error appears in the above identified patent and that said Letters Patent are hereby corrected as shown below:

Column 2, line 72, "produtcs" should read -- products --. Column 3, lines 22 and 23, cancel ", now U. S. Patent 3,393,080". Column 4, line 24, "prefreably" should read -- preferably --. Column 5, line 16, "micro-crystalline" should read -- microcrystalline --. Column 7, line 32, "Microsystalline" should read -- Microcrystalline --. Column 8, line 58, "mircocrystalline" should read -- microcrystalline --. Column 9, line 9, "forme" should read -- formed --; line 40, "18°" should read -- 18% --; line 52, "maner" should read -- manner --.

Signed and sealed this 14th day of April 1970.

(SEAL)
Attest:

Edward M. Fletcher, Jr.                                      WILLIAM E. SCHUYLER, JR.
Attesting Officer                                                   Commissioner of Patents